US006942800B2

(12) United States Patent
Jungbauer

(10) Patent No.: US 6,942,800 B2
(45) Date of Patent: Sep. 13, 2005

(54) SEPTIC SYSTEM TREATMENT PROCESS

(76) Inventor: Michael J. Jungbauer, 21212 E. Bethel Blvd., East Bethel, MN (US) 55011

( * ) Notice: Subject to any disclaimer, the term of this patent is extended or adjusted under 35 U.S.C. 154(b) by 0 days.

(21) Appl. No.: 10/739,676

(22) Filed: Dec. 18, 2003

(65) Prior Publication Data

US 2004/0129634 A1 Jul. 8, 2004

Related U.S. Application Data

(63) Continuation-in-part of application No. 09/991,818, filed on Nov. 19, 2001, now abandoned.

(51) Int. Cl.[7] .................................................. C02F 3/00
(52) U.S. Cl. ...................................... 210/610; 210/620
(58) Field of Search ............................. 210/532.2, 220, 210/170, 610, 620, 747

(56) References Cited

U.S. PATENT DOCUMENTS

| 4,826,601 A | * | 5/1989 | Spratt et al. ................. 210/610 |
| 6,245,237 B1 | * | 6/2001 | Blough et al. .............. 210/620 |
| 6,485,647 B1 | * | 11/2002 | Potts .......................... 210/616 |

* cited by examiner

Primary Examiner—Chester T. Barry
(74) Attorney, Agent, or Firm—Nikolai & Mersereau, P.A.

(57) ABSTRACT

Septic systems for home and commercial use can be built or upgraded to be less prone to failure by adding aeration equipment in septic tanks and drain fields, in order to ensure proper oxygen levels in the waste effluent in the septic tank and in the drain field to ensure a healthy population of organisms. The septic system may also benefit from the addition of organisms, enzymes or chemicals to enhance the benefits of aeration. Proper organism populations, in combination with proper aeration in the septic tanks and drain fields, will greatly reduce system failures, or restore failed systems.

2 Claims, 1 Drawing Sheet

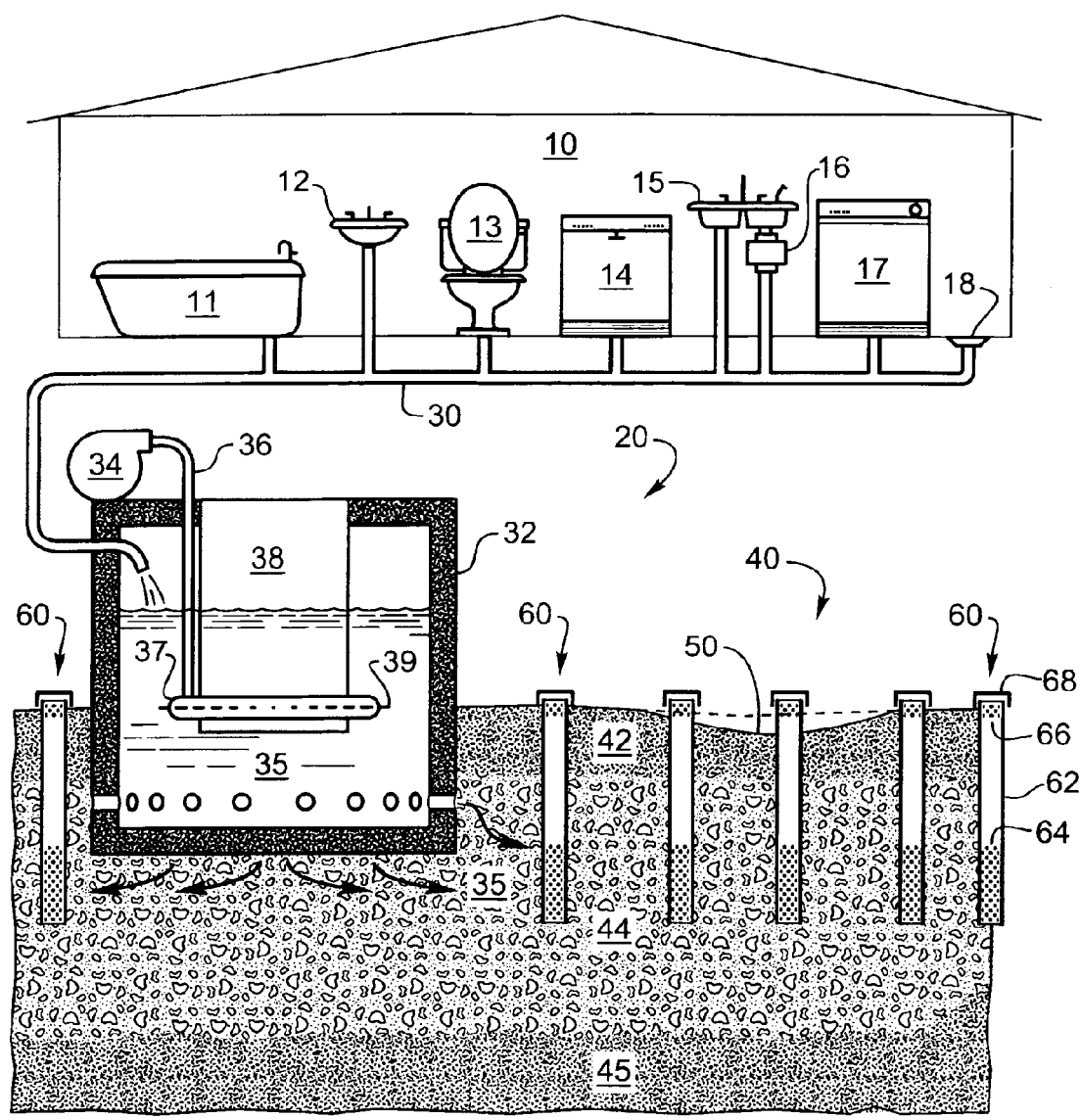

SEPTIC SYSTEM TREATMENT PROCESS

This application is a continuation-in-part of Ser. No. 09/991,818 filed Nov. 19, 2001, now ABN.

BACKGROUND OF THE INVENTION

1. Field of the Invention

This invention relates to septic systems and more specifically to a process for waste treatment, for preventing system failures, and for rejuvenating failed systems.

2. Description of the Related Art

In septic systems, there are frequently failures of the system resulting in water backups into homes and businesses, or insufficient treatment of the waste materials resulting in pollution of the area around the septic tanks, or drain fields, and potential runoffs which may damage ecosystems, streams, rivers, and nearby properties.

Failures of septic systems occur for a variety of reasons, including, overloading the septic tank with grease, fats and oils, which overburden the system. The septic system effectiveness may be reduced by the use of soaps, antibiotics, or chemicals which kill the organisms intended to biologically break down the waste materials in the septic system. The septic tank may also contain too high of a concentration of organic solids which can clog the septic tank.

The septic system may fail due to lack of oxygen in the septic tank, or in the drain field, or both. The organisms that break down the organic materials in the septic system need oxygen to thrive. If the organism population is reduced by lack of oxygen, cleaning chemicals, antibacterial soaps, medications, or other chemicals, the system can fail due to the septic tank being clogged with materials not broken down by the organisms. Further, organisms open the soil up and aerate the drain field. Without a healthy population of such organisms, the drain field and surrounding soils may become compressed and impermeable, or an overdeveloped biomat may develop, causing a backup of waste into the household or business, or a surfacing of the waste above the drain field and consequent run off and pollution.

A process of treating wastes in a septic system is needed which will restore unhealthy or blocked septic systems and keep septic systems healthy to protect the system from breakdowns and protect the environment.

SUMMARY OF THE INVENTION

The septic system treatment process restores and maintains septic systems by keeping the organisms in the system healthy from one end of the system to the other.

Oxygen is added to the septic tank to ensure the organisms therein are not oxygen starved. Oxygen is also added to the drain field to make sure that the organisms therein are not oxygen starved, thus preventing an over developed biomat. Healthy populations of organisms which feed on organic waste will keep the system functioning, eliminating backups and ensuring proper waste treatment to protect the environment.

If needed, organisms can be added to the populations in the system to get the system back to normal operation. Chemicals may also be added to liberate oxygen from materials in the system. Enzymes may also be used to stimulate biological activity.

The process provides an inexpensive remedy for failed septic systems and a reliable waste system for households and commercial properties.

OBJECTS OF THE INVENTION

It is an object of the invention to prevent backups of wastewater septic systems.

It is an object of the invention to keep wastewater septic systems healthy and in operation.

It is an object of the invention to restore clogged or unhealthy wastewater septic systems to a functioning condition.

It is an object of the invention to prevent pollution due to septic system failures.

It is an object of the invention to provide a remedy for home and commercial-sized septic systems.

It is an object of the invention to reduce the cost of restoring a septic system to health.

Other objects, advantages and novel features of the present invention will become apparent from the following description of the preferred embodiments when considered in conjunction with the accompanying drawings.

BRIEF DESCRIPTION OF THE DRAWINGS

The FIGURE is a schematic showing the septic system.

DESCRIPTION OF THE PREFERRED EMBODIMENTS

Referring to the FIGURE, in a typical household, a pipe 30 carries the wastes 35 mixed with water from the household 10 to the septic system 20. The septic system 20 comprises at least one septic tank 32 (or multiple septic tanks, aerobic tank, or cesspool), and a drain field 40 adjacent the septic tank 32. Household 10 is a source of waste material 35 from bath tubs 11, bathroom sinks 12, toilets 13, dish washing machines 14, kitchen sinks 15, disposals 16, clothes washing machines 17, and floor drains 18. These sources will deliver to septic system 20 organic wastes from humans in the form of solids, liquids, and toilet paper. The septic tank 32 will also receive grease, fats, oils, ground foodstuffs, soaps, medical wastes, and chemical wastes, which are to be treated by the septic system 20. In commercial settings, other wastes may be added to the system, such as chemical wastes or other biodegradable wastes.

The septic tank 32 is equipped with a blower 34 which forces air through a hose 36 into an air ring 37 supported by a cylinder 38 in the septic tank 32. The air ring has holes or nozzles 39 therein for mixing air into the waste 35. The air contains oxygen, and the oxygen levels in the waste 35 are therefore kept up to levels most favorable to flourishing of the organisms living in the septic tank.

In cases where the septic system does not have a means for adding oxygen into the septic tank 32, an aerator such as shown in the FIGURE can be added to the septic tank 32 by hanging a cylinder 38 supporting a hose 36 and an air ring 37 for adding air to the waste 35. It has been found that when the lack of a healthy population of organisms in the waste 35 is the cause of the failed system, that a combination of adding air, and repopulating the organisms in the tank, can repair the system in as little as 72 hours. The percolation rate in the drain field area 40 can be increased from zero to 50% in 36 hours, and to a normal percolation rate in 72 hours. The septic tank turbidity is related to the number, position and size of air holes or nozzles 39 used on the air ring 37.

The effluent waste 35 in the septic tank 32 leaves the tank by way of holes and enters the drain field 40, which has an aggregate rock layer 44 and a top fill layer 42 on the ground 45. The waste 35 is further treated by organisms as it flows through the drain field 40. The drain field 40 should also have access to oxygen to keep the organism population at a healthy level. The organisms living in the drain field 40 help keep the drain field open by keeping the top fill 40, dirt and soil in the aggregate rock 44, and ground 45, from clumping up and blocking the flow of waste 35, in order to prevent backups into the septic tank 32, and into the household 10.

Oxygen is added to the drain field 40 by use of aerator holes 60 having aerator pipes 62 therein, which bring air from above the surface of the top fill 42 to the aggregate rock layer 44. The number of aerator holes 60 needed is proportional to the amount of oxygen needed to supply the waste with oxygen to keep the organism population at effective levels for cleaning the waste and breaking down the biomat. A typical drain field 40 for use in a normal household 10 would have six aerator holes 60 in the drain field 40. The aerator holes 60 can be added to an existing drain field 40 by augering a six inch diameter hole down to the aggregate rock 44 level and placing an aerator pipe 62 therein. The aerator pipe 62 can be a four-inch inner diameter pipe with perforated holes 64 at the gravel bed level and holes 66 at the cap 68 to provide passive aeration to the drain field. Similarly, aerators 60 with aeration pipes 62 can be installed while constructing a new drain field 40. The size and length of the aerator hole 60 and the aerator pipe may be varied and remain within the scope of the invention. The standard auger size currently in use in the industry is 6 inches and the a 4 inch aerator pipe easily works therein but other sizes may be used so long as air is passively introduced to the drain field.

When a drain field does not have a healthy population of organisms, the top fill 42 may become compacted or depressed, as shown by sink 50, indicating that the ground beneath has become clumped together from the lack of organisms keeping the top fill 42 open and aerated.

There can be many causes for the populations of organisms to drop off in the system and particularly in the drain field. The common use of antimicrobial soaps and cleaners has counteracted the natural presence of bacteria and enzymes in the waste system and therefore for the system to work properly the bacteria and enzymes must be reintroduced for the system to work properly or to quickly be rejuvenated in case of a system failure. Other causes of organism reductions are antibacterial drugs, which are present in human waste and other chemicals either entering the system trough the plumbing of a house or building or applied to the drain field which kill the organisms in a septic system. When the organism population becomes too low they septic system can fail. It is therefore important to add a combination of organisms, enzymes, and nutrients to the septic system to increase the organism populations to increase the effectiveness of waste clean up in the system and to help the system recover quickly.

Another factor affecting the drain field 40 is rain. Rainwater competes with the flow of waste 35, and rainwater may have a pH, which changes the health of the organism community. In addition, fertilizers, herbicides, pesticides and other chemicals can also reduce the organism population. Without a good percolation rate in the drain field the effluent will not flow and may come to the surface or back up the system into the household. A surface back up will then run off, causing pollution.

In systems that have failed, tests in the drain field and in the septic tank may indicate the cause of the system failure. When the cause is a reduced population of organisms, more organisms may be introduced, along with enzymes, or chemicals known to increase the populations of the organisms in the system.

The organisms used in septic systems are a combination of microbes and bacteria, that break down, or fractionalize, or degrade the organic and inorganic materials in the septic tanks and drain fields. Enzymes may also be used to enhance the biological activity in the waste effluent.

Sometimes nutrients such as molasses, sugar, or phosphates, are added to the septic system to encourage organism growth. Other growth promoting additives include forms of oxygen-liberating substances, such as hydrogen peroxide, potassium carbonate, and sodium percarbonate, and bio-surfactants or other surfactants, all available commercially.

Drain fields may fail due to biological Oxygen Demand (OD) levels, total suspended solids levels, and fat, oil, and grease levels. These failures may be corrected by increasing the dissolved oxygen levels in the septic tank to between 5 and 6 mg/l. The dissolved oxygen level will typically vary over time due to the inability of the system to hold the septic tank within these ranges at all times, depending on system use, and may be below 5 mg/l or above 6 mg/l at times such as after several flushes of a toilet or running a shower. It is preferable to keep the dissolved oxygen in the septic tank at from about 5 mg/l to about 6 mg/l.

Obviously, many modifications and variations of the present invention are possible in light of the above teachings. It is therefore to be understood that, within the scope of the appended claims, the invention may be practiced otherwise than as specifically described.

What is claimed is:

1. A septic system treatment process comprising the steps of:
    providing a septic tank for collection of effluent,
    aerating effluent in a septic tank in the septic system to provide a dissolved oxygen level of from about 5 milligrams per liter to about 6 milligrams per liter,
    providing a drain field adjacent the septic tank for receiving effluent therefrom, and
    aerating the drain field with a plurality of aerator holes, each aerator hole having an aerator pipe therein, such that air is passively introduced in the drain field down to the level of the aggregate rock therein.

2. A septic system treatment process as in claim 1 with the further step of,
    adding a combination of organisms, enzymes, and nutrients to the septic system to increase the organism populations and their effectiveness in waste clean up.

* * * * *